United States Patent [19]

Maisonville

[11] 3,763,420
[45] Oct. 2, 1973

[54] METHOD AND APPARATUS FOR TESTING INTERNAL COMBUSTION ENGINES

[75] Inventor: Richard C. Maisonville, Detroit, Mich.

[73] Assignee: Scans Associates, Inc., Livonia, Mich.

[22] Filed: Nov. 22, 1971

[21] Appl. No.: 200,974

[52] U.S. Cl. .................................. 324/16 R, 73/118
[51] Int. Cl. .............................................. F02p 17/00
[58] Field of Search ...................................324/15–18
73/116–119; 33/1 N, 1 PT;
235/92 MP; 340/206

[56] References Cited
UNITED STATES PATENTS

| | | | |
|---|---|---|---|
| 3,454,871 | 7/1969 | Notting | 324/16 |
| 3,474,667 | 10/1969 | Fuchs | 324/16 |
| 2,597,677 | 8/1971 | MacCrea | 324/15 |

*Primary Examiner* — Michael J. Lynch
*Attorney* — D. Edward Dolgorukov

[57] ABSTRACT

This application discloses a method and apparatus for measuring and/or adjusting the timing angle of internal combustion engines. The method of measuring the timing angle comprises the steps of running the engine and producing voltage pulsations of uniform time frequency against which are simultaneously taken measurements of two values: first, the measurements of engine speed by counting the number of pulsations for one full and precise revolution of the engine from top dead center to top dead center of one selected cylinder, and simultaneously counting the number of pulsations from the moment the spark plug of the selected cylinder fires to the top dead center (for the advance firing) or from the top dead center to the moment of firing of the spark plug (for retarded firing). Counting two of such values enables the testing personnel to express the timing angle in degrees and to have the RPM of the engine at the time of testing, neither of which would be available if only one of such two values was measured. The disclosed test apparatus also provides a mechanism responsive to such measurements, which mechanism gives a readout of the revealed timing angle and compares it with the set range of timing angles, and a servo-mechanism which automatically adjusts the obtained timing angle to the desired value within such set angle. In one of its aspects the application discloses a test stand which may be conveniently used for tests, and a conveyor connecting into a single system a plurality of such stands to test the engines, particularly but not exclusively automobile engines under production conditions, as the system may also be used to test engines when operating in an automobile.

32 Claims, 14 Drawing Figures

METHOD AND APPARATUS FOR TESTING INTERNAL COMBUSTION ENGINES

This invention relates to internal combustion engines, such as automobile engines, and more particularly to an improved method and apparatus for measuring and/or adjusting the timing angle of the engine, i.e., the angle of occurrence of igniting spark in the cylinder of the engine with respect to the top dead center position of the pistons of the respective cylinders. In one of its aspects, the invention relates to providing an improved automatic testing system, such as a conveyor serving a plurality of test stands, with each of said stands adapted to receive a test engine and to operate such engine in a manner to reveal the time of occurrence of the ignition spark with respect to the top dead center position of the engine piston, and to set or adjust such time, usually referred to as "timing angle," at a predetermined or desired point.

A co-pending patent application of Richard L. Smith and Dennis F. Sauerbrey discloses a method and apparatus for adjusting the timing angle with the use of encoder producing fast pulsations, such as 3600 pulsations per one revolution of the engine, or 10 pulsations per degree. The basis of that system is counting, in effect, degrees. By such count, this system gives timing angle and brings the desired result.

Such system produces good results and is particularly adaptable to certain conditions. However, it cannot be economically used under all conditions. Encoder is a rather expensive device and, in addition, it is very fragile. It is very sensitive to shocks and can become unusable after receiving relatively mild shocks. Furthermore, the encoder has to be connected to the engine in a test system. It cannot be easily connected to the engine of a vehicle in such condition as in the parking lot.

One of the objects of the present invention is to devise a method and apparatus for measuring and/or adjusting the timing angle of the engine without requiring the use of an encoder.

Another object of the present invention is to provide an improved test system to measure the timing angle of an internal combustion engine irrespective of whether or not the engine is in a test stand or is operating in a motor vehicle or is installed for test in any other suitable condition.

Another object of the present invention is to provide an improved engine testing system to have the engine reveal its timing angle, which system can be conveniently used in repair garages with the limitations of equipment and personnel present in such garages.

Another object of the invention is to provide an improved test stand adapted to receive and to operate a test engine to reveal its timing angle, but without producing actual ignition in the cylinders thereof, thus eliminating the necessity of operating the engine on gasoline or on any inflammable gas, such as butane gas, as well as eliminating the inconveniences and complications connected therewith.

Another object of the invention is to provide an improved testing system for automobile engines, said system including a plurality of test stands receiving test engines from loading stations to have each engine securely installed in a respective stand for the test, to run the engine in a manner to reveal correctly its timing angle, to adjust the distributor automatically to produce a desired timing angle, to remove the test engine from the respective test stand, and to deliver the tested engine to the unloading station.

A further object of the invention is to provide an improved engine test stand adapted to receive and to run the test engine to reveal its timing angle, all without requiring cooling the engine with water or removing exhaust gases.

A still further object of the invention is to provide an improved engine testing system adapted to run the engine to reveal its timing angle, to release its distributor fixing means, such as distributor hold down bolt, to adjust the distributor to produce a predetermined timing angle, and thereupon to retighten said fixing means.

A still further object of the present invention is to provide an improved engine testing system of the foregoing character, and including a spark plug operated by the ignition system of the engine, as related to a selected cylinder, means to produce pulsations of uniform time frequency, means to count simultaneously the number of pulsations so produced for one complete revolution of the engine and, therefore, also for one degree of engine rotation, and at the same time count the number of such uniform pulsations that take place from the moment the spark plug of the selected cylinder fires until the moment the piston of the selected cylinder reaches the top dead center. The timing angle is then obtained by dividing the time of the last value by the time for one degree of engine rotation.

It is a further object of the invention to provide an improved timing angle measuring and/or adjusting system in which the uniform pulsations are produced by a crystal oscillator of known and uniform time frequency.

It is a further object of the invention to provide an improved timing angle measuring and/or adjusting system in which the signal is received from a magnetic pickup activated by the harmonic damper and is given at the beginning and at the end of one revolution of the engine at top dead center.

A still further object of the present invention is to provide a second signal at the moment the spark plug of the selected cylinder fires.

A still further object of the present invention is to pass the two signals through a signal conditioner which converts each of the signals into a low voltage pulse compatible with the system.

A still further object of the present invention is to provide an improved method and apparatus for measuring and/or adjusting timing angle of internal combustion engines, in which method and apparatus there is taken simultaneously a count of two values with respect to the same uniform time pulsations. First, the count of pulsations per one full and precise revolution of the engine, which gives also the number of pulsations per one degree of engine rotation; and, second, the number of pulsations from the moment the spark plug in the selected cylinder fires to the moment when the piston in the selected cylinder reaches the top dead center (for advanced firing). It can be understood that having received the values for both of these counts, the timing angle may be easily computed. On the other hand, if only one system of value is counted, the timing angle is not obtainable since if number of pulsations in the timing angle is obtained, there is no way of expressing it with relation to the degrees of rotation of the engine since the value of the pulsations in the timing angle not being expressed with relation to rotation of the engine is meaningless.

A still further object of the present invention is to provide an improved method and apparatus for measuring and adjusting the timing angle of an internal combustion engine which also gives the values for RPM of the engine during the time the measurements are taken.

A still further object of the present invention is to produce an improved method and apparatus for measuring and/or adjusting the timing angle of internal combustion engines, which timing angle measurement can be used to adjust the distributor and to compare the obtained results with the high and the low limits of the established range of such angle.

A still further object of the invention is to provide an improved method and apparatus for measuring and/or adjusting the timing angle of the engine, in which there is provided a servo-mechanism to adjust the distributor.

A still further object of the present invention is to provide an improved method and apparatus for measuring and/or adjusting the timing angle of internal combustion engines wherein the necessary mathematical calculations are performed with the use of binary mathematics.

It is an added object of the present invention to provide an improved test system of the above nature which is relatively simple in construction, dependable in operation, is operated with the minimum of personnel, and is relatively easy to repair and service.

Further objects and advantages of this invention will be apparent from the following description and appended claims, reference being had to the accompanying drawings forming a part of this specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

The co-pending application of Richard L. Smith and Dennis F. Sauerbrey discloses a method and apparatus of measuring and adjusting the timing angle of an internal combustion engine by measuring, in effect, the degrees of the angle through which the spark is advanced. With the use of such a method and apparatus, only one set of values is being measured and after the answer in terms of such a value, namely the size of the timing angle, is received, the process is, in effect, completed.

In accordance with my invention, I measure simultaneously two values. First, I measure the time for one full and precise revolution of the engine from top dead center of the selected cylinder to the top dead center thereof. I make such measurements against uniform pulsations produced with the device capable of producing pulsations of sufficient frequency, which frequency must be uniform. While such pulsations are produced, I also measure the number of pulsations occurring from the moment the spark in the selected cylinder fires to the moment the piston in the selected cylinder of the engine reaches the top dead center (for advanced timing). Measuring both values at the same time, I receive values which enable me to compute the timing angle of the engine.

It can be easily understood that if I would count only one value, such as the pulsations from the moment the spark plug of the selected cylinder fires to the moment the piston in the selected cylinder reaches top dead center, I would receive only the time which elapsed between these two moments but would have no way of expressing this time in terms of the angle, that is timing angle, since in order to do that I would need to know the time the engine takes to rotate through one degree. Since I count at the same time the number of pulsations through one full and exact revolution, I can compute the number of pulsations per one degree by dividing the number of pulsations for one revolution by 360. Thereupon, I divide the number of pulsations which occurred between the moment of the spark plug firing to the moment the piston in the selected cylinder reaches the top dead center position by the number of pulsations for one degree. In such a manner I obtain the timing angle expressed in degrees.

Since we are concerned primarily with automobile engines which operate on the principle of four-stroke cycle, the engine makes two full revolutions during which the spark plug fires once. Therefore, I prefer to count the number of pulsations for two full and exact revolutions.

The above-described method of simultaneously counting two values, namely first the number of pulsations with respect to revolutions of the engine and thereupon number of pulsations which take place while the engine rotates through the timing angle, I obtain a definite answer which could not be received counting only one value.

Any device producing known and uniform pulsations can be used for the purpose of the present invention. Since counting of pulsations is done simultaneously, only one device producing pulsations may be used, and both values be counted against pulsations produced by such device.

For the purposes of producing pulsations, I prefer to use a crystal oscillator since such a device can be selected to produce known and uniform pulsations of exceedingly high frequency, such as two million pulsations per second.

In order to define the limits of one revolution or two revolutions, I use indications of top dead center, which indications can be produced with magnetic pickup cooperating with such a device as harmonic damper provided on the engine.

Spark plug firing in one selected cylinder is used, and such spark plug may be either within the cylinder or outside. The indication of the piston in the same selected cylinder reaching the top dead center may be the same as that used to designate the limit of the revolutions.

In the drawings, there is shown an embodiment of the invention operating in a manner as required for measuring and/or revealing the timing angle of one or more automobile engines in production testing of such engines.

I adapt my system to production requirements in an automobile plant. The engine may be tested in any suitable condition it is found in production without any special stands or conveyors, or the test may be made in one stand, or in a large number of stands connected by a conveyor into one system adapted to receive the engines from loading stations and to distribute them to unoccupied stands of the conveyor for test, and after the test to receive them from the test stands and direct them to an unloading station.

It should be understood that it is possible to produce and use a signal other than that of true top dead center as long as the exact relationship between the signal and true top dead center is known so that the resulting answer may be corrected by this difference. Similarly, it is possible to use a signal other than the number one spark plug as long as the exact relationship between the signal and the firing of the number one spark plug is known so that the resulting answer may be corrected by this difference. For example, the number two spark plug could be used.

It should be further understood that it is possible to produce and use a signal other than from a pre-selected spark plug, such as from the coil, or the impulses generated by the distributor.

Figure 1:
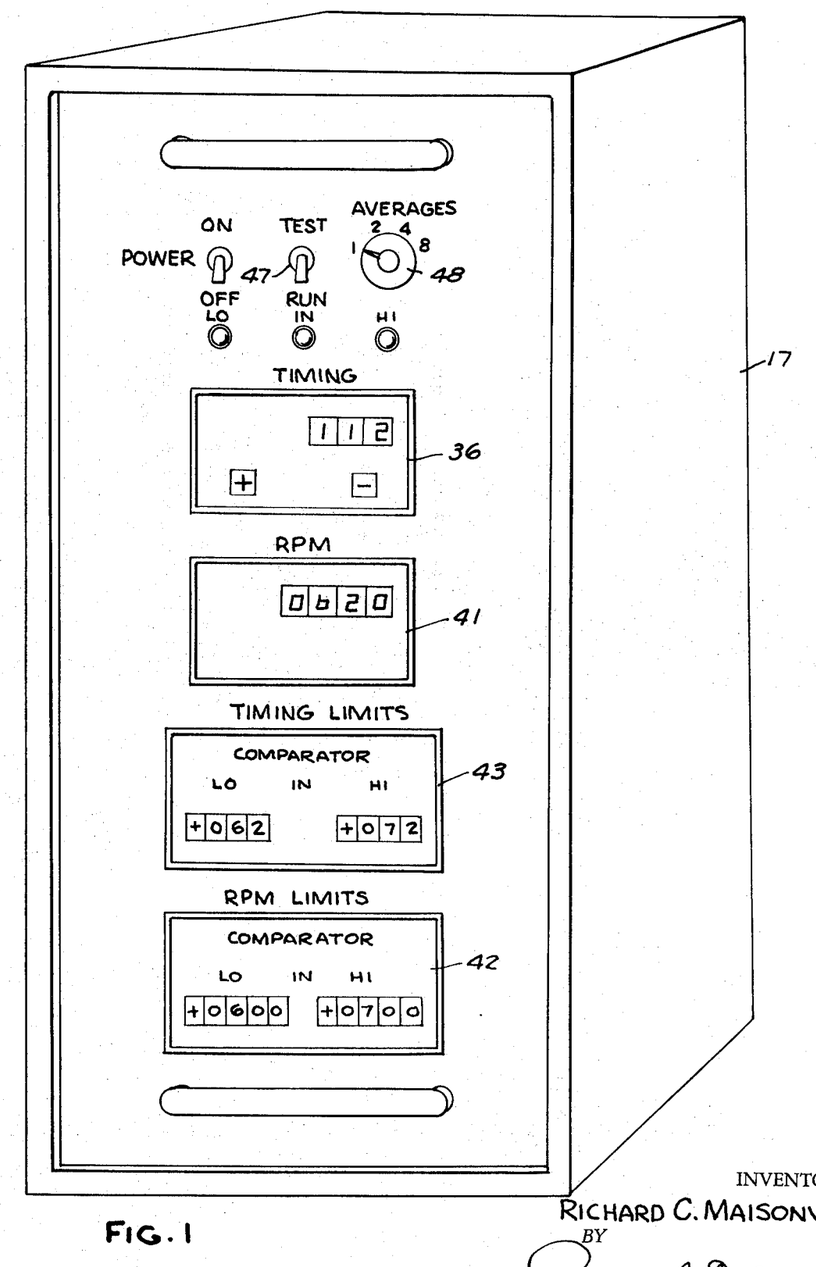
FIG. 1 is a perspective view of the control box for operating the system of the present invention.
Figure 2:
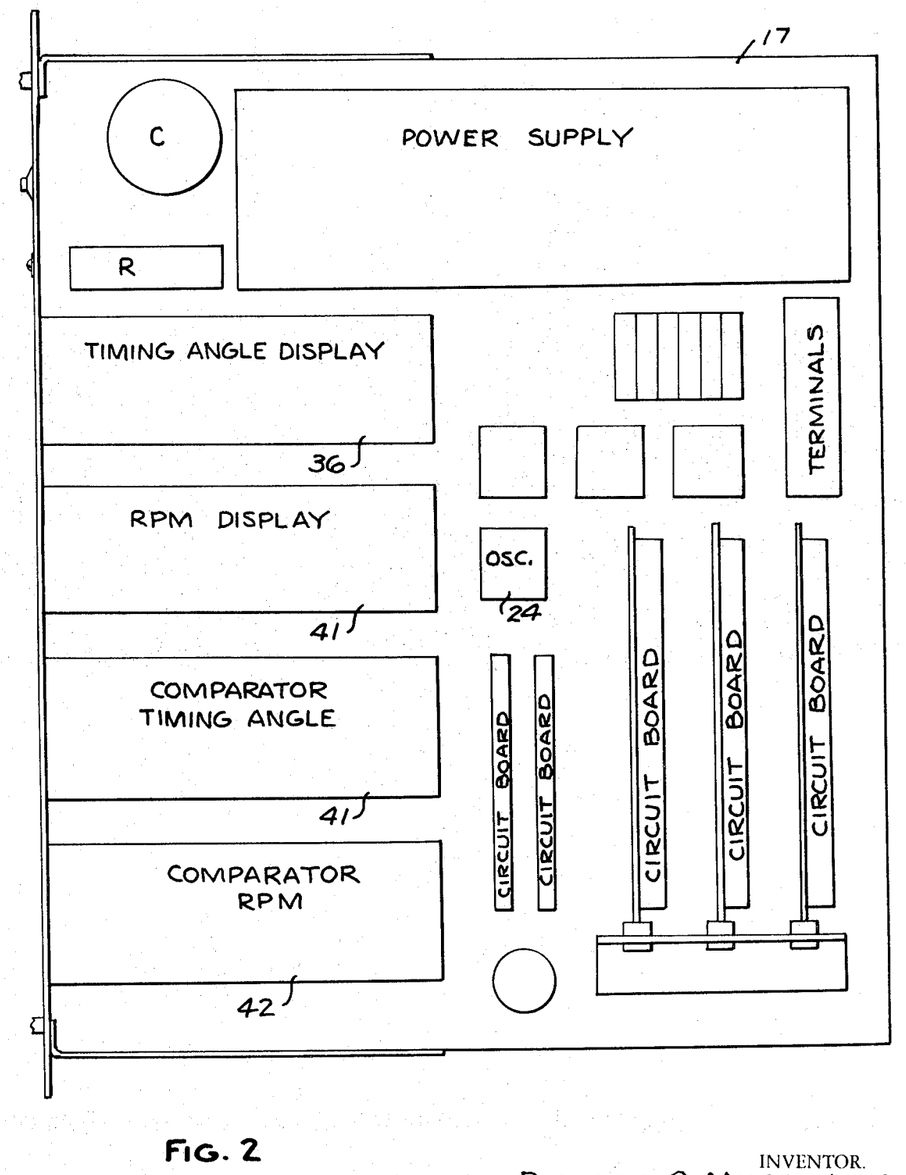
FIG. 2 is a side view of the construction of FIG. 1 with one side panel removed.
Figure 3:
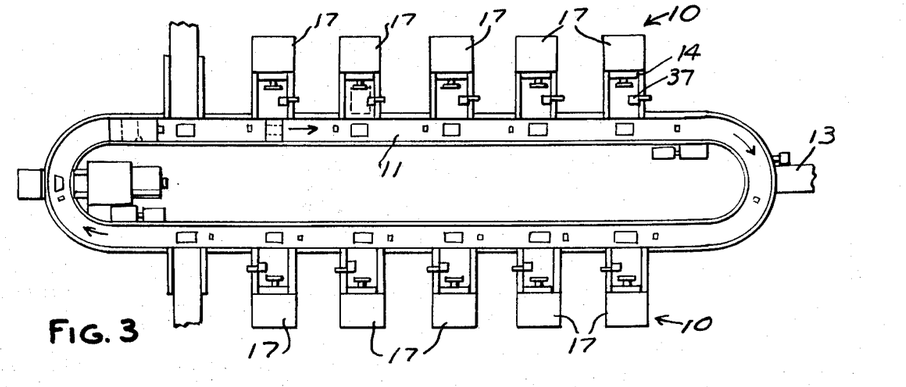
FIG. 3 is a plan view of the system as it may be used in a plurality of test stands connected by a conveyor for measuring and/or adjusting the timing angle of internal combustion engines in quantity production.

Referring specifically to FIG. 3, the same shows a test installation including a plurality of test stands 10 interconnected with the aid of a conveyor 11, which may be such as those disclosed in the co-pending applications of V. G. Converse III, et al., Ser. No. 707,033, filed on Feb. 21, 1968 for Accumulator Conveyor System, and Ser. No. 717,103, filed on Mar. 29, 1968 for Automated Engine Test Conveyor, now U.S. Pat. No. 3,527,087. The conveyor 11 is adapted to serve such stands 10 by delivering the test engines, such as 12, (see FIG. 4) from the loading station 13 to the respective stands. The test stand which is empty would receive for test the first passing untested engine, and upon completion of the test return the tested engine to the conveyor for delivery to the station 13 for unloading. The tested engine would not be received by any other stands, even if the stand is empty.

The test performed in each stand depends on the requirements set therefor, and the engines may be run on gasoline, butane gas, or may be operated by compressed air or by an electric or fluid (gas or liquid) motor. Use of compressed air or an electric or fluid motor insures maintenance of a predetermined speed and does not require cooling of the engine, although water may be used in the engine to perform leak tests such as to determine leakage from water cavity to atmosphere. Oil pressure can also be conveniently checked in this test by being continuously monitored while the engine is running, with a view of stopping the engine should oil pressure fail. A visual and audible check for noise can also be done.

Figure 4:
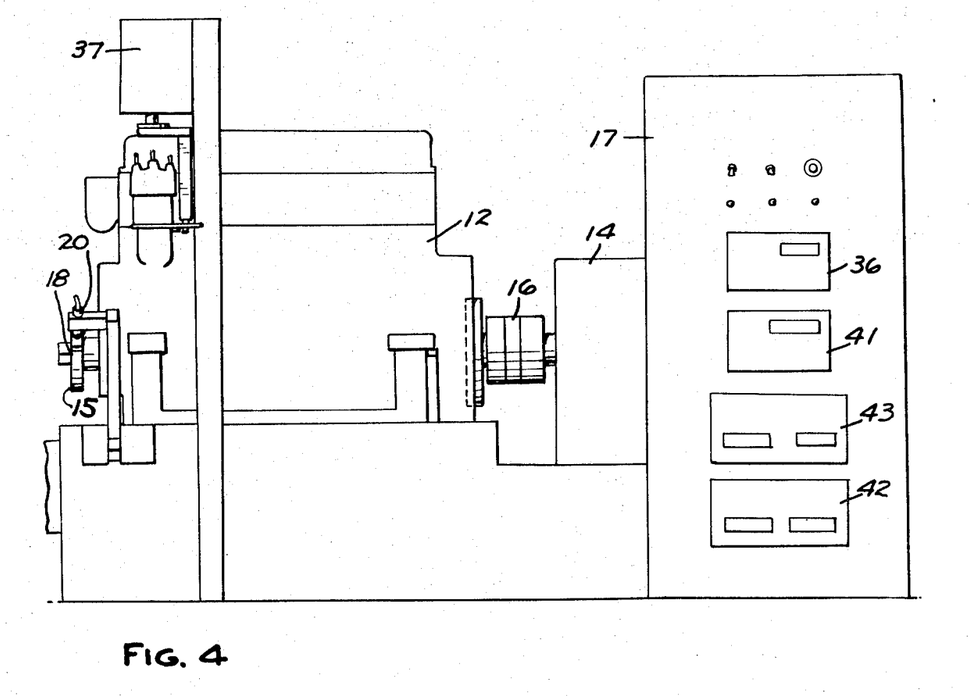
FIG. 4 is a side view of one test stand with the engine shown in said stand.

FIG. 4 illustrates one test stand showing a test engine 12 received by the stand and operatively positioned therein to be driven with the aid of a motor 14 connected to the engine 12 by the coupling 16. The control box 17 is provided in the stand 10 for the purposes explained below.

Now turning to the computation of the timing angle, this is accomplished by measuring the time in seconds between the moment of firing of the number one spark plug (assuming advanced timing) and the moment the piston of the selected cylinder reaches top dead center, and dividing this number by the time in seconds per one degree of engine revolution. This can be represented by the mathematical formula: Timing Angle = 720 $Y/X$, where $Y$ equals time in seconds between spark plug firing and top dead center and $X$ equals the time in seconds for two revolutions of the engine.

In order to be able to get values for $Y$ and $X$, two signals from the engine are needed, the top dead center (TDC) signal and the spark firing signal.

Referring to FIG. 4, the TDC (top dead center) signal is produced as follows: On the front end of the engine 12 there is operatively mounted a harmonic damper 15 provided on its periphery with a slot or notch 18 related to the top dead center position of the piston of number one cylinder. A magnetic pickup 20 is operatively installed in the stand in such a manner that when the piston of number one cylinder is at its top dead center position, the notch 18 cooperates with said magnetic pickup 20 in such a manner that an electrical impulse is produced each time the number one cylinder is at its top dead center position. This is the TDC signal, the use of which will be explained below.

Figure 5:
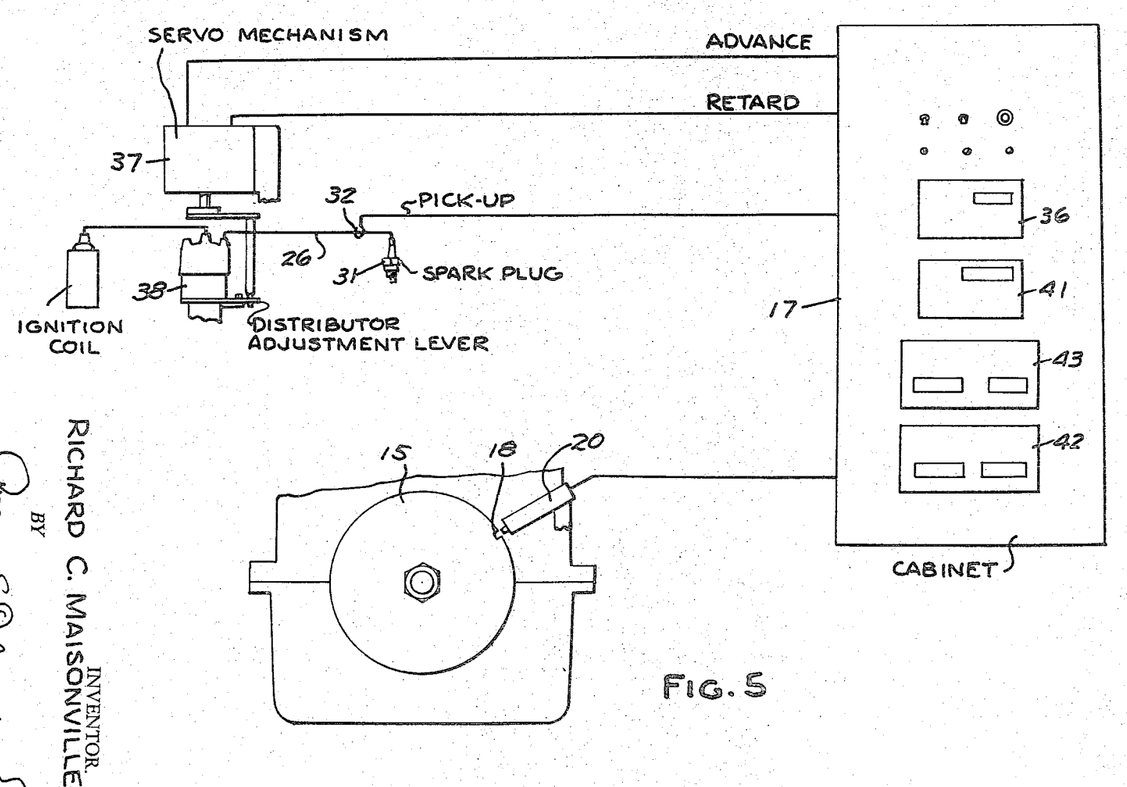
FIG. 5 is a diagram showing one system as it may be used on an engine outside a test stand.

Referring to FIG. 5, the distributor 38 supplies high voltage through the spark plug wire 26 to fire the spark plug 31. The spark firing signal is produced by a wire loop, coil, or clip 32 surrounding the spark plug wire 26, a current being induced in said wire loop, coil, or clip 32 each time the high voltage passes through the spark plug wire 26. This induced current is the spark firing signal whose purpose will be explained in detail below. It should be understood that in accordance with the invention, the spark plug 31 does not need to be mounted in the engine 12 but can be mounted externally thereto, or the spark firing signal may be produced without the use of any spark plug.

Figure 6:
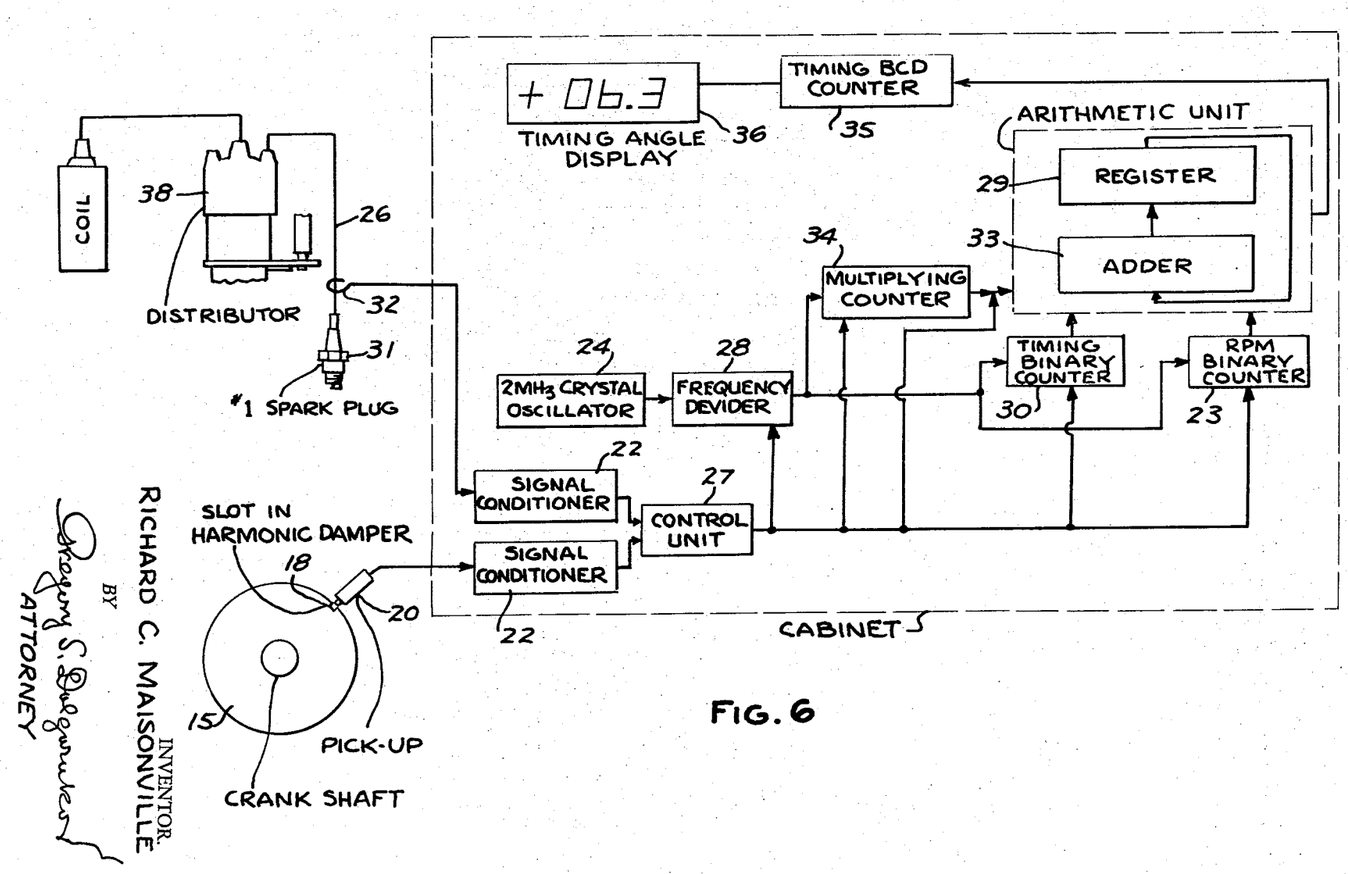
FIG. 6 is a diagram showing one system with a multiplying counter, binary timing counter and timing binary coded decimal counter.
Figure 7:
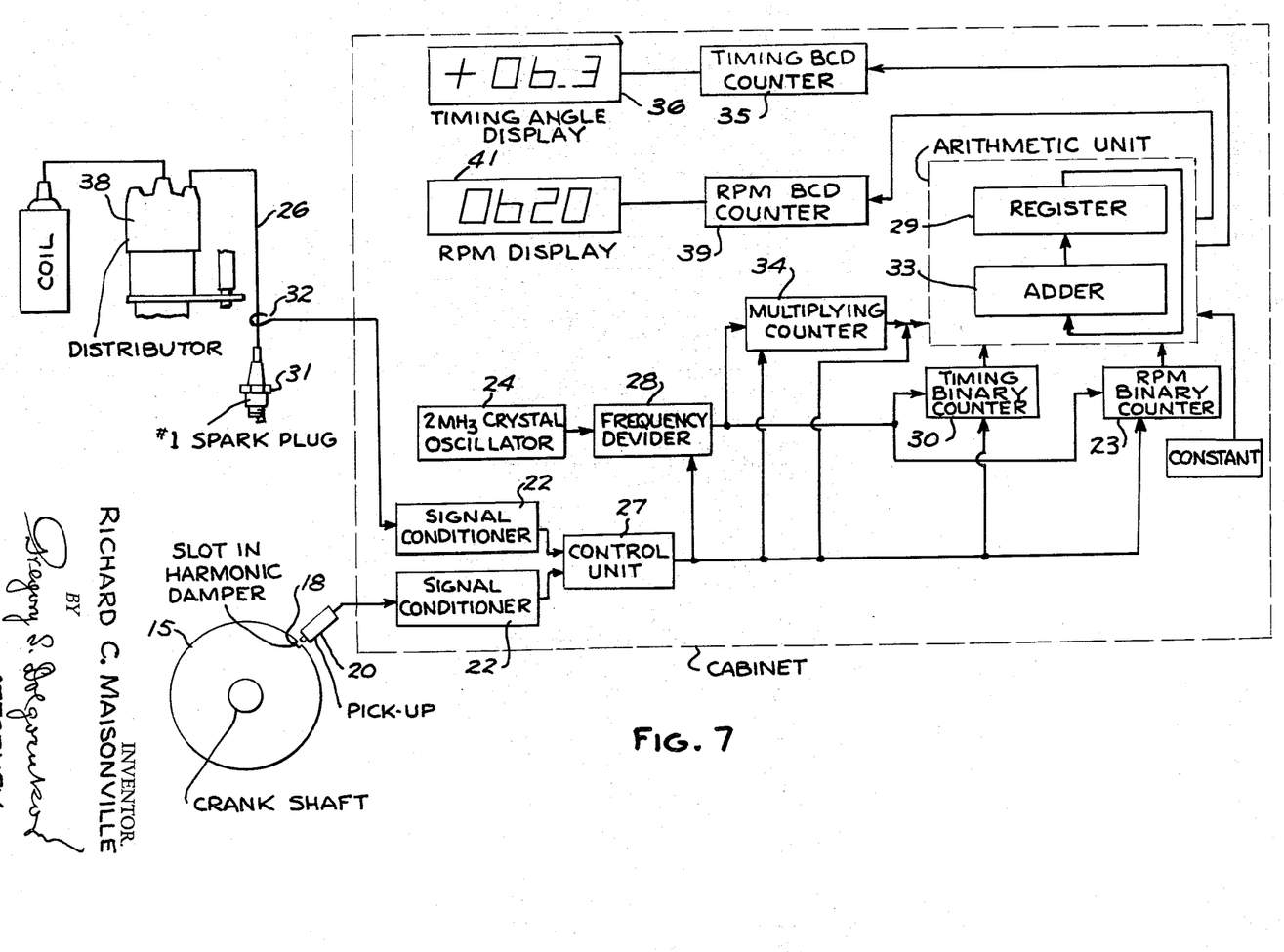
FIG. 7 is a diagram showing a complete system with the multiplying counter, timing binary counter, timing binary coded decimal counter, RPM binary counter, and a RPM binary coded decimal counter.
Figure 8:
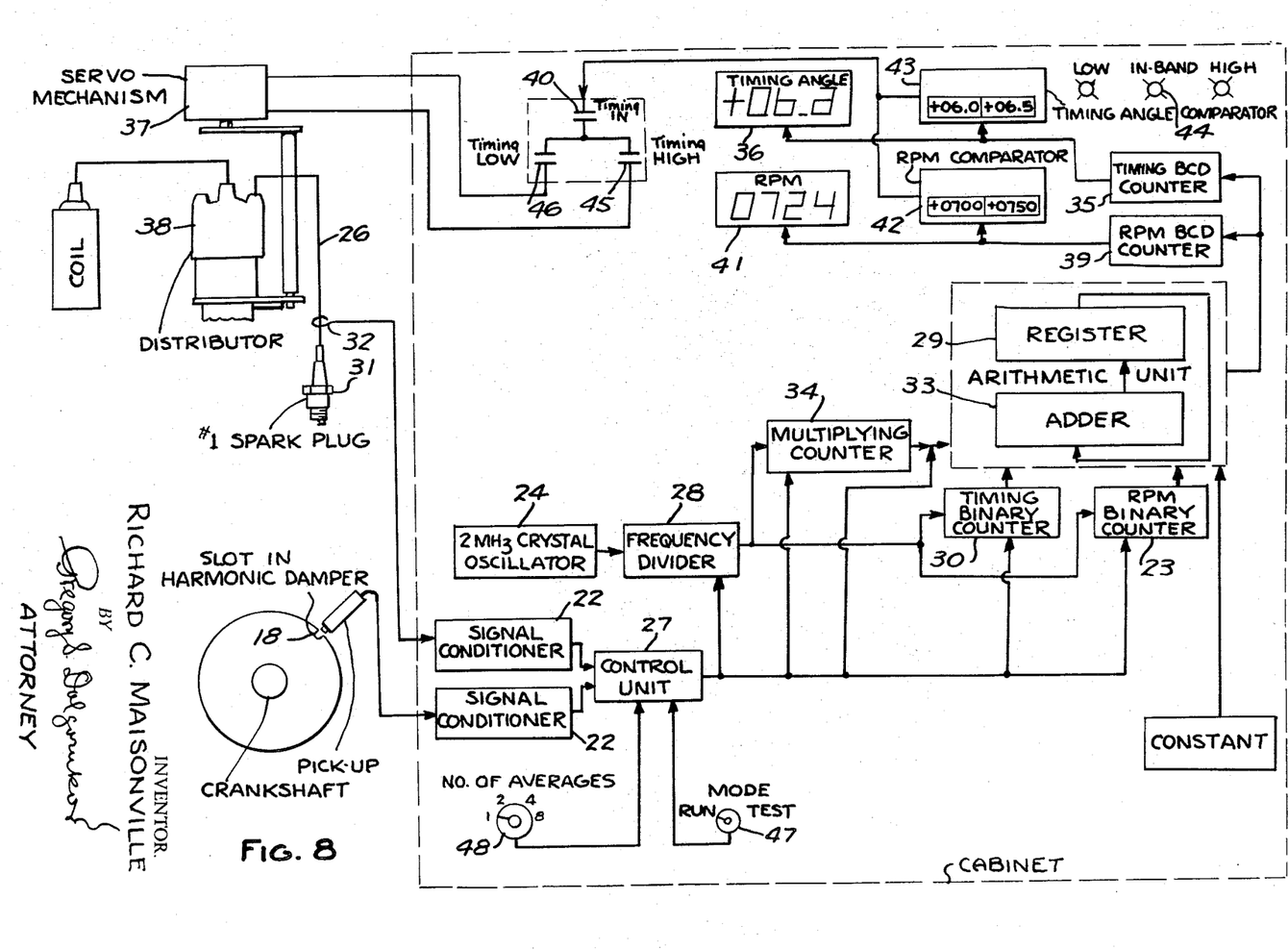
FIG. 8 is a diagrammatic view of the complete system, including the apparatus necessary to compute the timing angle and RPM of the engine, to compare the timing angle obtained with a predetermined range of timing angles, for the predetermined range of RPM and automatically adjust the distributor to produce a desired value of timing angle, and further including means to internally test the system to insure its correct operation.

Referring to FIGS. 6, 7 and 8, the TDC signal obtained in the above manner from the magnetic pickup 20 is then passed through a signal conditioner 22 which transforms the input signal into a short duration pulse (approximately 10 microseconds), which is compatible with the rest of the system. This signal is then used to turn on the RPM binary counter 23 to start counting pulsations being produced by the crystal oscillator 24. The circuit will then measure the time interval for two complete revolutions of the harmonic damper 15 which is equivalent of two revolutions of the engine. This is accomplished by a control unit 27 which turns on the RPM binary counter 23 when a top dead center signal is sensed. The counter continues to count pulsations of the frequency produced from a frequency divider 28 which is driven by the crystal oscillator 24, until two revolutions of the harmonic damper are completed, the completion of which is signaled by another top dead center signal. The result of this count of pulsations is stored in the RPM binary counter 23 and is proportional to the value of X above.

Since we are concerned with a four-stroke cycle engine, during the two revolutions of the engine just measured, the number one spark plug must have fired once. For an advanced ignition system, the spark firing signal will occur slightly before top dead center, and for a retarded ignition system the spark firing signal will occur slightly after top dead center. The circuit measures the number of pulsations occurring between the spark plug firing and top dead center (for advanced timing). This is accomplished by the control unit 27 which turns on the timing binary counter 30 when the spark firing signal from the wire loop, coil, or clip 32 is sensed, and turns the timing binary counter 30 off when the top dead center signal is sensed. During the interval that the timing binary counter 30 is turned on, it counts the pulsations of the frequency produced from the frequency divider 28 which is driven by the crystal oscillator 24. This count of pulsations is proportional to the value of Y needed in the above formula.

The actual timing angle computation in this embodiment of the invention is then performed. The register 29 is cleared, the contents of the timing binary counter 30 is applied to the input of the adder 33. This number is added a number of times proportional to 720 to the contents of the register 29 via the adder 33 and the resulting new answer is placed in the register 29, the number of additions being counted by the multiplying counter 34. The previously stored contents of the RPM binary counter 23 is applied to the input of the adder 33 in its negated form. This number is added to the contents of the register 29 via the adder 33 with the result being placed in the register 29. If the register 29 now contains a positive non-zero number, one pulse is counted by the timing binary coded decimal (BCD) counter 35. This process is repeated as long as the register 29 contains a positive number. When this process stops, the timing BCD counter 35 then contains the result of the multiplication of the constant by Y and then that quantity being divided by X which then equals 720 Y/X, which is the timing angle. A timing angle display 36 is provided to give a visual readout of the timing angle so obtained.

If the spark plug fires before top dead center, the positive indicator light on the timing angle display 36 will show the engine as running in an advanced spark condition. If the top dead center signal comes before the spark plug fires, the engine is running in a retarded condition and the negative indicator light will signal this condition.

If it is desired to time the engine in a retarded condition, the time duration between top dead center and spark plug firing is still a positive number and the calculations are all performed in exactly the same manner as above.

Now, referring specifically to FIG. 7, this figure shows the same system as shown in FIG. 6 with the additional apparatus needed to calculate the RPM.

The RPM of the engine is calculated by dividing 60 (the number of seconds in a minute) by the time in seconds for one revolution of the engine. This can be represented by the mathematical equation: RPM = 120/X, where X represents the time for two revolutions of the engine.

In the present embodiment of the invention, the actual RPM calculation using the above formula is done as follows: The register 29 is cleared and a number proportional to the constant 120 is added to the register 29 via the adder 33, with the resulting answer being put back in the register 29. The previously stored contents of the RPM binary counter 23 is applied to the adder 33 in its negated form. This negated number is added to the register 29 via the adder 33, with the resulting answer placed in the register 29. If the register 29 now contains a positive, non-zero number, one pulse is counted in the RPM binary coded decimal (BCD) counter. This process is repeated as long as the register 29 contains a positive number. The RPM BCD counter 39 will now contain the result of the division of the constant divided by the contents of the RPM binary counter 23 which is equal to 120/X, which is the RPM of the engine.

It should be understood that in both of these calculations, the actual circuitry and numbers used therein have been scaled to minimize the amount of circuitry and approximately maintain the same degree of resolution throughout the circuit. Therefore, numbers that are proportional to the constants in the previously cited formulas are used rather than the actual numbers.

Referring specifically to FIG. 8, an RPM display 41 is provided to give a visual readout of the RPM of the engine. Also, the results of the RPM calculation are applied to the RPM comparator 42 which compares the contents of the RPM BCD counter 39 to predetermined lower and upper limits. If the number is not within these limits, the timing comparator 43 is disabled by the lockout relay 40 and the timing angle display is blanked out. If the RPM is within predetermined limits, a timing angle comparator 43 compares the contents of the timing BCD counter 35 to lower and upper limits and illuminates one of the appropriate indicator lights 44 to indicate whether the timing is high, low, or in band, and if needed also energizes one of the appropriate relays to drive the servo-mechanism 37 in the appropriate direction to adjust the distributor 38 to produce a desired value of the timing angle.

One of two relays would be energized. If the timing angle were too high, the high value relay 45 would be activated and would activate the servo-mechanism 37 so as to rotate the distributor 38 in the appropriate direction to lower the timing angle, at which time the calculation and comparison process would start anew to see whether the new value of the timing angle is in band. If the timing angle is too low, the low value relay 46 would be activated in such a manner as to have the servo-mechanism 37 rotate the distributor in the opposite direction, thus raising the timing angle, with the same recalculation and recomparison process again following.

The above process, when complete, has calculated the timing angle and RPM, compared the RPM with a desired range and if the RPM is in the desired range, used the value of the timing angle to adjust the distributor to obtain a desired timing angle.

The servo-mechanism and its control circuitry may be eliminated and the adjustment done by hand if the system is used manually.

An engine simulation test which can be selected by the mode switch 47 supplies through the frequency divider pulses representing top dead center and spark to be used in place of the signals coming from the signal conditioners 22. Under these conditions, specific numbers should be displayed on the timing angle display 36 and on the RPM display 41. This provides for an easy internal self test to check the operation of the unit.

Also, if a more stable result from the system is desired, instead of performing the timing and RPM calculation over two revolutions of the engine, it may be performed over a larger number of revolutions. I prefer to use powers of the number 2 (i.e. $2^z$, where $z = 0, 1, 2, \ldots$) since the system performs its mathematical computations in the binary system, which is based on the number 2. A number of averages, such as 4 or 8, can be selected by the number of averages switch 48.

It should be understood that measuring the number of pulsations through two full and exact revolutions of the engine may be done between spark firings, since that equals two revolutions of the engine.

Figure 9:
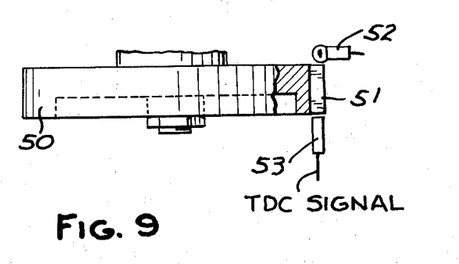
FIG. 9 is a modification of means for producing the top dead center signal by using a slot in the harmonic damper.

FIG. 9 shows the damper 50 provided with the slot 51, and having a bulb 52 providing a light signal to affect a light sensor, such as a phototransistor 53, to provide a top dead center signal.

Figure 10:
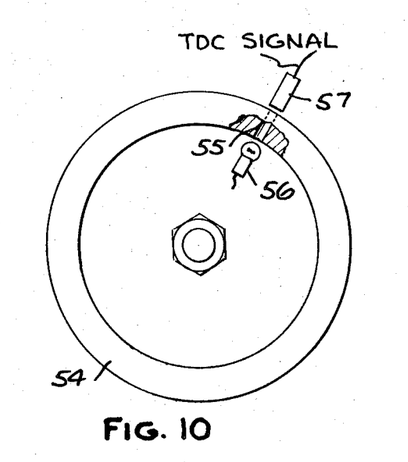
FIG. 10 is still another modification of means for producing a top dead center signal by using a hole in the harmonic damper.

FIG. 10 shows another modification of the harmonic damper. The damper 54 is provided with a hole 55 having an electric light 56 on one side and a light sensor on the other side.

Figure 11:
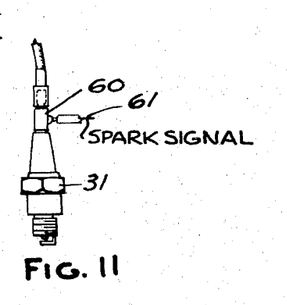
FIG. 11 shows another method of picking up a signal when the spark plug fires by a non-inductive means.

FIG. 11 shows the spark plug 31 having a metal tube 60 provided on the top of the spark plug to noninductively receive the spark signal and convey it to the signal conditioner 22 through the wire 61.

Figure 12:
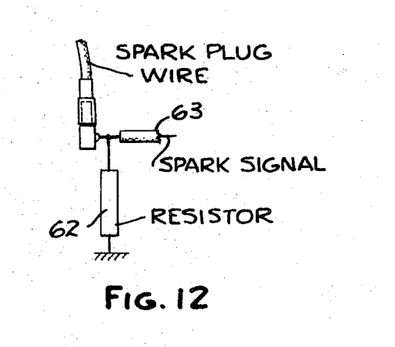
FIG. 12 shows a method of picking up said spark signal without the use of a spark plug.

FIG. 12 shows use of a resistor 62 to take the place of the spark plug, one side of the resistor 62 being grounded, the signal being transmitted to the signal conditioner through the wire 63.

Figure 13:
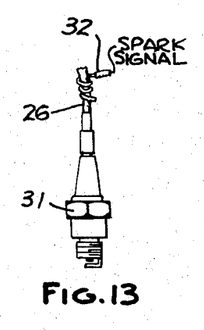
FIG. 13 shows an inductive method of picking up a spark signal.

FIG. 13 shows a wire loop, clip, or coil 32 around the spark plug wire 26 to inductively produce the spark firing signal when the spark plug 31 fires.

Figure 14:
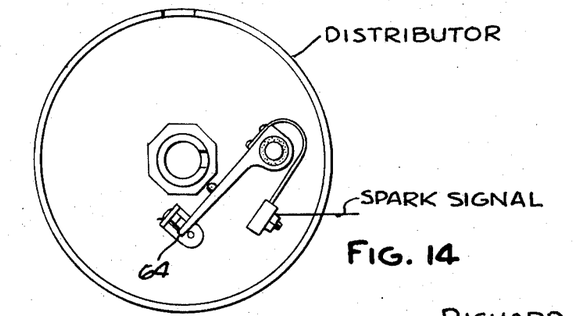
FIG. 14 shows a method whereby the spark signal can be picked up from the distributor of the internal combustion engine.

FIG. 14 shows the distributor points 64 producing the signal to the signal conditioner 22.

There is thus provided an improved testing system for internal combustion engines whereby the objects of the present invention listed above and numerous additional advantages are attained.

I claim:

1. A device for measuring the timing angle of an internal combustion engine, said device including means to measure the time which the engine takes to rotate one full and exact revolution from top dead center to top dead center, means to simultaneously measure the time which the engine takes to rotate from the moment the spark plug in one selected cylinder fires to the moment the piston in the same cylinder reaches its top dead center position, means to determine the time the engine takes to rotate through one degree of the full and exact revolution just measured, and means to divide the time the engine takes to rotate from the moment the spark plug fires to the moment the piston reaches its top dead center position by the time the engine takes to rotate through one degree, thereby obtaining the timing angle of the engine.

2. The device defined in claim 1 and including means to determine the RPM of the engine on the basis of time the engine takes to rotate one revolution.

3. A device for measuring the timing angle of an internal combustion engine, means to produce voltage pulsations of uniform time frequency, means to count said pulsations for at least one full and exact revolution of the engine, means to simultaneously count pulsations between the moment the spark plug of a selected cylinder fires and the moment the piston of said selected cylinder reaches top dead center, means determining the number of pulsations for one degree of engine rotation of the revolution for which said pulses were counted and means to thereupon divide the number of pulsations between moment of the spark plug firing and the piston reaching its top dead center position by the number of pulsations the engine took to rotate one degree, thereby determining the timing angle.

4. A device for revealing the timing angle of an internal combustion engine, said device including an oscillator adapted to produce electrical pulsations of a uniform time frequency, means to produce an electrical signal at the moment the piston of a predetermined cylinder reaches its top dead center pOsition, means responsive to said electrical signal to begin a first count of said pulsations from the moment said piston reaches its top dead center position and continuing said first count for at least one full and exact revolution of the engine, means to convert said first count into the time for one degree of engine rotation, means operating during the time said first count is being taken to produce an electrical pulse at the moment the spark plus of said predeterined cylinder fires, means responsive to said electrical pulse to begin a second counting of pulsations occuring from the moment of said spark plug firing to the moment the piston next reaches its top dead center position, means to convert said second count of pulsations into the time which the engine required to rotate between said spark plug firing and said top dead center, and means to divide the time which the engine required to rotate between said spark plug firing and top dead center by the time for one degree of engine rotation, thus obtaining the timing angle.

5. The device as defined in claim 4 and including means to relate said first count of pulsations to the speed in revolutions per minute of the engine.

6. The device defined in claim 5 and including means to compare the timing angle so obtained with a predetermined range of timing angles.

7. The device as defined in claim 6 and including a servo-mechanism responsiVe to said comparing means and adapted to adjust the engine distributor to a position to produce a timing angle within said predetermined range.

8. A device for measuring the timing angle of an internal combustion engine, said device including a frequency divider, an oscillator adapted to produce, by means of said frequency divider, electrical pulsations of a uniform time frequency, means to produce an electrical signal at the moment the piston of a predetermined cylinder reaches its top dead center position, means responsive to said electrical signal to begin a first count of said pulsations from the moment said piston reaches its top dead center position and continuing said first count for two full and exact revolutions of the engine, means to convert said first count into the time for one degree of engine rotation, means operating during the time said first count is being taken to produce an electrical pulse at the moment the spark plug of said predetermined cylinder fires, means responsive to said electrical pulse to begin a second counting of pulsations occurring from the moment of said spark plug firing to the moment the piston next reaches its top dead center position, means to convert said second count of pulsations into the time which the engine required to rotate between said spark plug firing and said top dead center, and means to divide the time which the engine required to rotate between said spark plug firing and top dead center by the time for one degree of engine rotation, thus obtaining the timing angle.

9. The device defined in claim 8, wherein the means for producing the top dead center signal is in the form of a magnetic pickup.

10. The device defined in claim 8, wherein the means for producing the top dead center signal is in the form of a photoelectric device.

11. The device defined in claim 8, wherein the means to produce a signal when the spark plug fires is in the form of a coil around the spark plug wire.

12. The device defined in claim 8, wherein means to produce a signal when the spark plug fires is in the form of a wire loop around the spark plug wire.

13. The device defined in claim 8, wherein the means to produce a signal when the spark plug fires is in the form of a clip placed on the spark plug wire.

14. The device defined in claim 8, wherein the means to produce the spark firing signal is in the form of a resistor replacing a spark plug, and adapted to noninductively produce a spark plug firing signal.

15. The device defined in claim 8, wherein said signal responsive means include signal conditioners to convert the electrical pulses into signals compatible with the system, a control unit connected to said signal conditioners to receive these signals, a timing binary counter connected to said control unit to make said second count of pulses and store the result thereof, an RPM binary counter also connected to said control unit to make said first count of pulses and store the result thereof, and a multiplying counter, an arithmetic unit consisting of an adder and a register connected to said RPM and binary counters and receiving a signal from said multiplying counter, and a timing binary coded decimal counter connected to said arithmetic unit, all adapted to perform the calculation of the timing angle from the information received from said RPM and said timing binary counter.

16. The device defined in claim 15 and including a display unit to give a visual readout of the timing angle.

17. The device defined in claim 16 and including a selector switch connected to said control unit and adapted to select the number of averages the timing angle will be calculated over.

18. The device defined in claim 17 and including a mode switch connected to the control unit and adapted to perform an internal test of the system.

19. The device defined in claim 15 including an RPM binary coded decimal counter.

20. The device defined in claim 19 and including a display unit to give a visual readout of the RPM of the engine being tested.

21. The device defined in claim 20 and including a timing comparator to compare the calculated timing angle with a predetermined range of timing angles and display the results of the comparison.

22. The device defined in claim 21 and including an RPM comparator to compare the calculated RPM with a predetermined range of RPM and blank out the timing angle display if the RPM is not within the predetermined range.

23. The device defined in claim 22, and including a servo-mechanism connected to said timing angle comparator and adapted to adjust the distributor to produce a desired timing angle.

24. A method of measuring the timing angle of an internal combustion engine having at least one cylinder, a piston, a spark plug, and a crankshaft connected to said piston; selecting one cylinder as the base cylinder, running the engine and determining the time required for one full and exact revolution of the engine from top dead center to top dead center, simultaneously determining the time elapsed between the firing of the spark plug in said base cylinder and the moment the piston in said base cylinder reaches its top dead center position, determining the time required for one degree of engine rotation for the revolution of the engine just measured, and dividing the time elapsed between the spark plug firing and the moment the piston in said base cylinder reaches its top dead center position by the time required for one degree of engine rotation, thereby determining the timing angle.

25. A method of measuring the timing angle of an internal combustion engine including at least one cylinder having a piston, a spark plug, and a crankshaft connected to said piston, running the engine and producing with the aid of an oscillator voltage pulsations of a predetermined frequency, counting said pulsations for one full and exact revolution of the engine from top dead center to top dead center, simultaneously counting said pulsations from the moment of spark firing to the moment said piston reaches its top dead center position in the advanced spark condition of the engine, determining from the number of pulses just counted for one full and exact revolution the time required for one degree of engine rotation during said revolution, and dividing the time interval between the spark plug firing and the piston reaching its top dead center position by the time required for one degree of engine rotation, thereby determining the timing angle.

26. The method as defined in claim 24, with the engine running in a retarded spark condition, determining the time required for one full and exact revolution of the engine, simultaneously determining the time interval between said piston reaching its top dead center position and said spark plug firing, determining from the number of pulses just counted for one full and exact revolution the time required for one degree of engine rotation during said revolution, and dividing the time between top dead center and the spark plug firing by the time required for one degree of engine rotation, thereby determining the timing angle.

27. The method defined in claim 25, with the time required for one degree of engine rotation being determined by producing electrical pulsations of a uniform frequency by means of an oscillator, counting the pulsations so produced by the oscillator during one revolution of the engine, relating the number of pulsations so counted to the time elapsed, and dividing the elapsed time by 360 to determine said time for one degree of rotation.

28. The method defined in claim 26, with the time required for one degree of engine rotation being determined by producing electrical pulsations of a uniform frequency by means of an oscillator, counting the pulsations so produced by the oscillator during one revolution of the engine, relating the number of pulsations so counted to the time elapsed, and dividing the elapsed time by 360 to determine said time for one degree of rotation.

29. A method of revealing the timing angle of an internal combustion engine including a distributor, a plurality of cylinders each having a piston, a spark plug, and a crankshaft connected to said piston, selecting one of the cylinders as a base cylinder, running the engine and producing with the aid of an oscillator voltage pulsations of a predetermined frequency, counting said pulsations for one full and exact revolution of the engine from top dead center to top dead center, simultaneously counting said pulsations from the moment of spark firing to the moment said piston reaches its top dead center position in the advanced spark condition of the engine, determining from the pulses just counted for one full and exact revolution, the time required for one degree of engine rotation during said revolution, and dividing the time between the spark plug firing and the piston reaching its top dead center position by the time required for one degree of engine rotation, thereby determining the timing angle.

30. The method defined in claim 29, with the engine running in a retarded spark condition, determining the time required for one full and exact revolution of the engine, simultaneously determining the time interval between said piston reaching its top dead center position and said spark plug firing, determining the time required for one degree of engine rotation and dividing the time between the piston reaching top dead center and the spark plug firing by the time required for one degree of engine rotation, thereby determining the timing angle.

31. The method defined in claim 29, with the time required for one degree of engine rotation being determined by producing electrical pulsations of a fixed frequency by means of a crystal oscillator, counting the pulsations so produced by the crystal oscillator during one revolution of the engine, relating the number of pulsations so counted to the time elapsed, and dividing the elapsed time by 360 to determine said time for one degree of rotation.

32. The method defined in claim 30, with the time required for one degree of engine rotation being determined by producing electrical pulsations of a fixed frequency by means of a crystal oscillator, counting the pulsations so produced by the crystal oscillator during one revolution of the engine, relating the number of pulsations so counted to the time elapsed, and dividing the elapsed time by 360 to determine said time for one degree of rotation.

* * * * *